United States Patent
Hurlburt

[11] Patent Number: 5,299,821
[45] Date of Patent: Apr. 5, 1994

[54] COMPOUND STEERING MECHANISM WITH FRONT MOUNTED IMPLEMENT ATTACHMENT APPARATUS

[75] Inventor: Joseph C. Hurlburt, Lancaster, Pa.

[73] Assignee: Ford New Holland, Inc., New Holland, Pa.

[21] Appl. No.: 61,542

[22] Filed: May 17, 1993

[51] Int. Cl.$^5$ .................................................. B60D 3/00
[52] U.S. Cl. ..................................... 280/503; 180/266; 172/279; 172/306
[58] Field of Search .............. 280/503, 116, 115, 114, 280/132, 79.3; 180/900, 265, 266, 267; 172/272, 273, 279, 280, 290, 308, 817

[56] References Cited

U.S. PATENT DOCUMENTS

| | | | |
|---|---|---|---|
| 1,733,544 | 8/1928 | Langdon | 280/103 |
| 2,452,829 | 11/1948 | Blaydes | 280/503 |
| 2,867,921 | 1/1959 | Brown | 172/306 |
| 3,016,987 | 1/1962 | Williamson | 187/9 R |
| 3,027,963 | 4/1962 | Nicholson | 180/144 |
| 3,370,670 | 2/1968 | Love | 180/144 |
| 3,669,194 | 6/1972 | Zurek | 172/280 |
| 3,749,421 | 7/1973 | Rudd | 280/503 |
| 4,640,523 | 2/1987 | Wolmarans | 280/503 |
| 4,771,851 | 9/1988 | Nystuen | 180/135 |
| 5,046,577 | 9/1991 | Hurlburt | 180/266 |

FOREIGN PATENT DOCUMENTS 1630721 8/1967 Fed. Rep. of Germany .
1928172 12/1978 Fed. Rep. of Germany ...... 172/279
8907545 8/1989 PCT Int'l Appl. .

Primary Examiner—Margaret A. Focarino
Assistant Examiner—Kevin Hurley
Attorney, Agent, or Firm—Larry W. Miller; Frank A. Seemar

[57] ABSTRACT

A tractor having a front axle that pivotally moves laterally in response to a corresponding steering action of the steerable wheels mounted on the front axle is disclosed wherein an implement attachment mechanism is detachably connected directly to the front axle in a manner so as to be laterally movable relative to the chassis with the shiftable front axle. The implement attachment mechanism includes a hydraulically powered lift mechanism to power a vertical movement of any implement attached thereto relative to the chassis. An optional supplemental support strap detachably connects to the frame portion of the implement attachment mechanism and engages the pivot assembly supporting the front axle from the chassis to provide additional support for connecting said implement attachment mechanism to said front axle without interfering with the pivotal movement of the front axle relative to the chassis.

9 Claims, 3 Drawing Sheets

COMPOUND STEERING MECHANISM WITH FRONT MOUNTED IMPLEMENT ATTACHMENT APPARATUS

BACKGROUND OF THE INVENTION

This invention relates generally to a steering mechanism for an agricultural tractor in which the front axle is laterally shiftable in response to a steering movement of the steerable wheels and, more particularly, to an implement attachment mechanism which is mounted directly to the shiftable front axle to enhance steering operation associated with front mounted implements.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of cylinder rod, causing a turning of the wheels.

Due to physical limitations relating to the range of movement of the steering mechanism and to the eventual interference between the steerable wheels and the steering axle, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length.

Traditionally, front mounted implements are connected to a three-point hitch attachment mechanism supported from the frame of the chassis to provide adequate support therefor. Steering of the tractor when front mounted implements are utilized can be difficult, particularly when the implement is a tillage device actively engaged with the ground. Such steering difficulties counteract the steering capability enhancements associated with a compound steering mechanism.

It would, therefore, be desirable to provide a mechanism for mounting an implement attachment mechanism directly to the laterally shiftable front axle so that the implement connected thereto would be laterally shiftable with the steering movement of the compound steering mechanism.

SUMMARY OF THE INVENTION

It is an object of this invention to overcome the aforementioned disadvantages of the prior art by providing an implement attachment mechanism connectable directly to the front axle of a tractor equipped with a compound steering mechanism.

It is another advantage of this invention that the implement attachment mechanism can be detached from the laterally shiftable front axle.

It is a feature of this invention that the front mounted implement will turn with the front axle relative to the chassis.

It is an advantage of this invention that the steering characteristics of a tractor having a front mounted implement connected thereto are improved.

It is another feature of this invention that the implement attachment mechanism is provided with a supplemental support strap detachably connected thereto and engaged with the pivot assembly mounting the front axle to the tractor chassis.

It is another advantage of this invention that the implement attachment mechanism can be adequately supported from the laterally shiftable front axle of a tractor having a compound steering mechanism without interfering with the pivotal movement of the front axle.

It is still another advantage of this invention that substantially uniform weight distribution of the implement attachment mechanism and the implement connected thereto on the front steerable wheels can be maintained whenever the front axle shifts laterally relative to the chassis.

It is still another feature of this invention that the implement attachment mechanism can be easily removed from the front of the tractor.

It is yet another advantage of this invention that the mounting of the implement attachment mechanism to the front axle improves tire clearance during lateral shifting of the axle relative to the tractor chassis.

It is a further object of this invention to provide an implement attachment mechanism cooperable with a laterally shiftable front axle, which is durable in construction, inexpensive of manufacture, carefree of maintenance, facile in assemblage, and simple and effective in use.

These and other objects, features, and advantages are accomplished according to the instant invention by providing a tractor having a front axle that pivotally moves laterally in response to a corresponding steering action of the steerable wheels mounted on the front axle wherein an implement attachment mechanism is detachably connected directly to the front axle in a manner so as to be laterally movable relative to the chassis with the shiftable front axle. The implement attachment mechanism includes a hydraulically powered lift mechanism to power a vertical movement of any implement attached thereto relative to the chassis. An optional supplemental support strap detachably connects to the frame portion of the implement attachment mechanism and engages the pivot assembly supporting the front axle from the chassis to provide additional support for connecting said implement attachment mechanism to said front axle without interfering with the pivotal movement of the front axle relative to the chassis.

BRIEF DESCRIPTION OF THE DRAWING

The advantages of this invention will become apparent upon consideration of the following detailed disclosure of the invention, especially when taken into conjunction with the accompanying drawings wherein.

DETAILED DESCRIPTION OF THE PREFERRED EMBODIMENT

Figure 1:
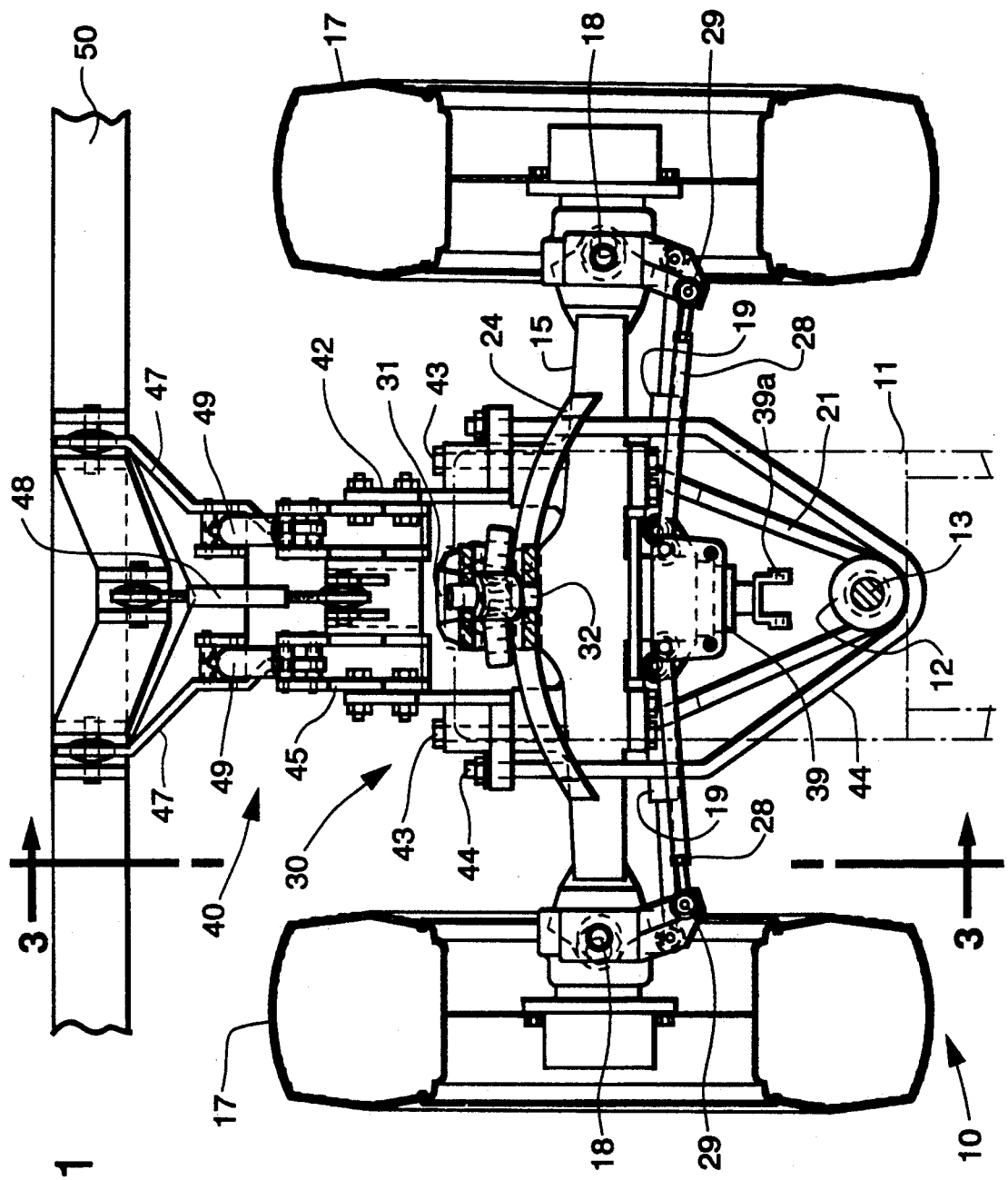
FIG. 1 is a top plan view of a front axle assembly for an agricultural tractor incorporating the principles of the instant invention, the front portion of the tractor chassis overlying the front axle assembly being shown in phantom, a representative implement being mounted to the attachment mechanism and partially broken away for the purposes of clarity.
Figure 2:
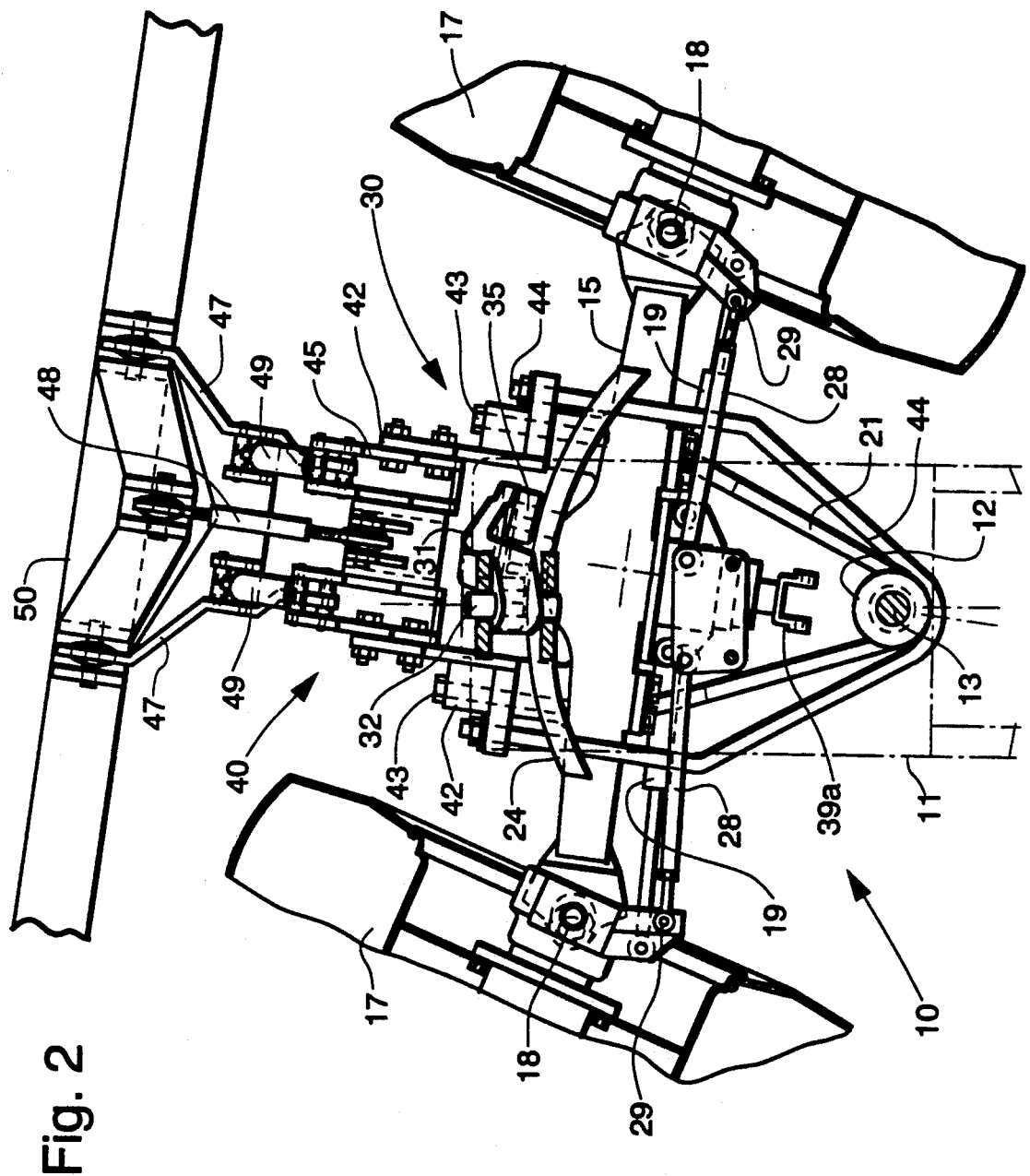
FIG. 2 is a top plan view of a front axle assembly similar to that of FIG. 1, except that the front axle has undergone a laterally shifting steering movement.
Figure 3:
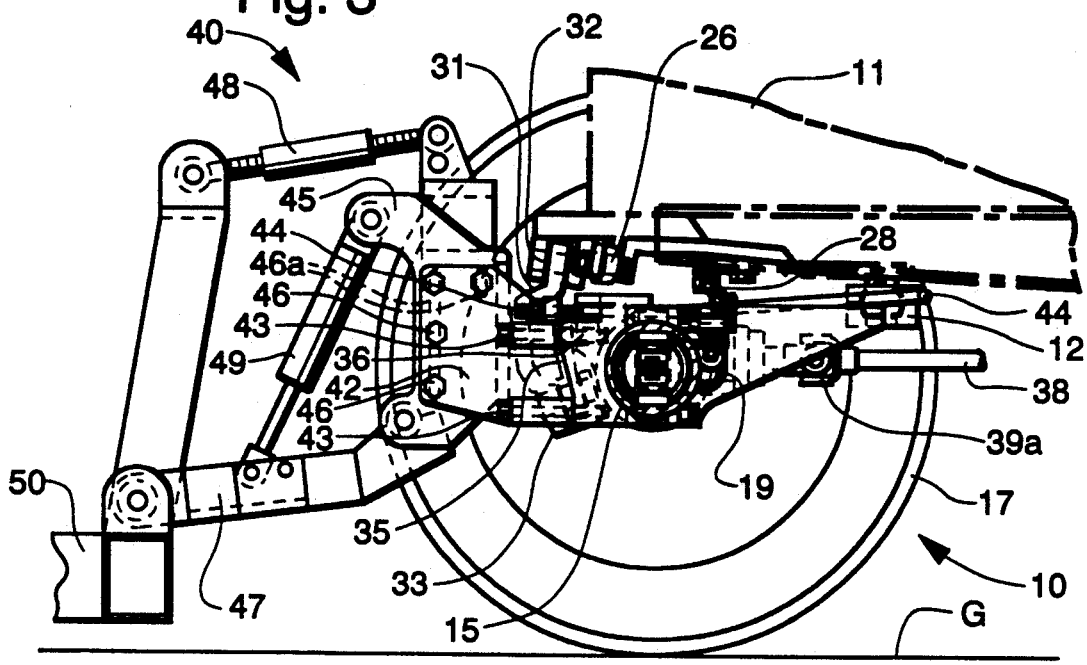
FIG. 3 is a partial cross-sectional view of the front axle assembly taken along lines 3—3 of FIG. 1 to show an elevational view of the implement attachment mechanism, a portion of the overlying chassis being shown in phantom.
Figure 4:
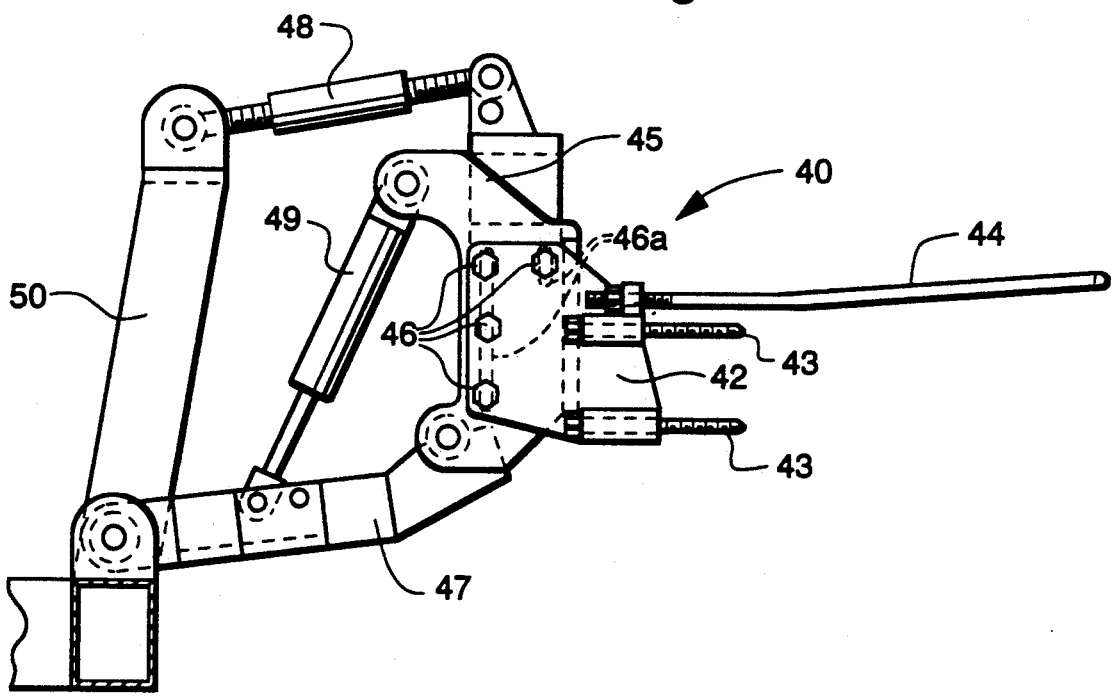
FIG. 4 is a schematic side elevational view of the implement attachment mechanism as shown in FIG. 3 with the front axle assembly and associated tractor structure removed for the purposes of clarity.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly 10 includes a transversely extending axle member 15 having pivotally mounted on the respective laterally opposing ends thereof a pair of steerable wheels 17 pivotable about respective nearly vertical axes 18 to effect a steering of the wheels 17 relative to the axle member 15. A pair of hydraulic cylinders 19 interconnect the axle member 15 and the steerable wheels 17 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature coincident with the pivot axis 12. The chassis 11 carries a pair of laterally spaced rollers 26 that are engageable with the arcuate track 24 when the front axle member 15 oscillates generally about a horizontal axis in response to changing ground contours and undulations so that the rollers 26 provide a limit to the vertical movement of the front axle member 15 relative to the tractor chassis 11 due to an engagement thereof with the arcuate track 24.

A pair of tie rods 28 interconnecting the chassis 11 and the steerable wheels 17 transmit steerable movement of the wheels 17 relative to the front axle member 15 and to a lateral shifting movement of the chassis 11 relative to the front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of the tie rods 28 interconnecting the chassis 11 and the wheels 17 at a connection point 29 spaced rewardly from the respective pivot axis or king pin 18 for the corresponding steerable wheel 17, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

The front yoke assembly 30 has a contoured front strap member 31 pivotally connected at a first pivot 32 to the chassis 11. The front strap member 31 also carries a pair of lower pivots 33 for pivotally supporting a corresponding pair of dog bone-shaped links 35 which, in turn, are pivotally connected to the front axle member 15 by respective pivots 36. Each of the pivots 32, 33, 36 associated with the front yoke assembly 30 have a corresponding pivot axis aligned with the ball joint 13 forming a part of the pivot axis 12 between the front axle assembly 10 and the tractor chassis 11. Accordingly, the pivot axis for each of the five pivots 32, 33, 36 have a nonparallel relationship intersecting a common point at the ball joint 13. As a result, the pivotal movement of the front axle assembly 10 relative to the tractor chassis 11, resulting in a lateral shifting of the front axle member 15, is accomplished through a four-bar linkage which has substantially no vertical component associated with the movement thereof.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 15 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

In accordance with the principles of the instant invention, it can be seen in FIGS. 1-4 that the implement attachment mechanism 40 is carried by the front axle assembly 10 intermediate of the steerable wheels 17 at a position centrally therebetween. The attachment mechanism 40 includes a fixed frame portion 45 fastened to a mounting bracket 42 carrying bolts 43 for detachably connecting the attachment mechanism 40 to the front axle 15. The mounting bolts 46 fastening the frame portion 45 to the mounting bracket 42 pass through slotted openings 46a to allow a relative vertical movement and/or a slight canting between the frame portion 45 and the mounting bracket 42 to accomodate a vertical positioning of the implement 50 relative to the front axle 15 and to allow a non-horizontal alignment of the implement 50 with respect to a horizontally disposed front axle 15. This latter feature can be particularly desirable for a ground working implement 50 to be maintained in a substantially horizontal orientation whenever one of the front wheels 17 is riding in a furrow or the like at an elevation lower than the other front wheel 17.

A supplemental support strap 44 is also detachably connected to the mounting bracket 42 and wraps around the subframe 21 and the pivot assembly 12 to provide additional support for the attachment mechanism 40 without interfering with the pivotal movement of the front axle 15 about the pivot assembly 12. One skilled in the art will readily realize that the supplemental support strap 44 would not be needed if the components mounting the implement 50 to the front axle 15, such as the mounting bracket 42, frame portion 45, bolts 43, etc., were strong enough to withstand the forces exerted through operation of the implement 50.

The attachment mechanism 40 further includes a lower link assembly 47 pivotally supported from the frame portion 45 and an upper link 48 also pivotally connected to the frame portion 45 to form a generally conventional three-point hitch mounting mechanism. A pair of hydraulic lift cylinders 49 interconnect the respective lower link assembly 47 and the frame portion 45 to provide operative power for raising and lowering the lower link assembly 47 relative to the frame portion 45. Whenever an implement 50 is connected to the lower link assembly 47 and the upper link 48, the lift cylinders 49 effect a raising and lowering of the implement 50 relative to the tractor chassis 11 and, therefore, the ground G.

By mounting the implement attachment mechanism 40, and therefore the attached implement 50, directly to the laterally shiftable front axle 15, the steering movement of the front axle 15, effecting a shifting of the axle 15 relative to the chassis 11 as described above, results in a corresponding lateral shifting of the implement 50, as is best depicted in FIG. 2. If the implement 50 is engaged with the ground G when operated, the lateral shifting of the implement 50 associated with the steering movement aids in effecting the steering movement since the forces exerted through the implement 50 would tend to further pull the steering mechanism in the direction of the turn being attempted.

Furthermore, the positioning of the implement attachment mechanism 40 directly to the front axle 15 intermediate of the wheels 17 allows the weight of the attachment mechanism 40 and the connected implement 50 to be evenly distributed between the wheels 17 irrespective of whether the front axle 15 is being turned to either direction or is being directed straight ahead. The detachable mounting of the attachment mechanism 40 via the bolts 43 and the supplemental support strap 44 allows the entire attachment mechanism 40 to be easily removed from the front axle 15 and replaced with another device such as a ballast assembly, not shown.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a tractor having a chassis; a transverse front axle connected by a pivot assembly to a forward portion of said chassis and having pivotally mounted thereon a pair of laterally spaced steerable wheels, said front axle being pivotally connected to said chassis for lateral movement relative thereto; and steering means operably connected to said steerable wheels and to said front axle to control the pivotal movement of said steerable wheels relative to said front axle and to effect a corresponding lateral movement of said front axle in response to the pivotal movement of said steerable wheels, the improvement comprising:

an implement attachment mechanism detachably mounted to said front axle for lateral movement therewith relative to said chassis, said implement attachment mechanism being operable to attach an implement forwardly of said tractor to be pushed by said tractor when moving in a forward direction.

2. The tractor of claim 1 wherein said implement attachment mechanism includes a frame portion, a lower link assembly pivotally connected to said frame portion, an upper link pivotally connected to said frame portion and a lift mechanism for effecting pivotal movement of said lower link assembly relative to said frame portion.

3. The tractor of claim 2 wherein said lift mechanism includes a pair of hydraulic cylinders interconnecting said frame portion and said lower link assembly to power the pivotal movement therebetween.

4. The tractor of claim 3 wherein said frame portion is detachably affixed to said front axle by fasteners.

5. The tractor of claim 4 wherein said frame portion further includes a support link detachably affixed thereto and engaged with said pivot assembly to provide additional support for connecting said implement attachment mechanism to said front axle without interfering with the pivotal movement of said front axle relative to said chassis.

6. A tractor comprising:
a chassis;
a transverse front axle pivotally connected to a forward portion of said chassis for movement about a pivot assembly defining a generally vertically extending pivot axis and having pivotally mounted thereon a pair of laterally spaced steerable wheels, said front axle being movable in a generally horizontal plane relative to said chassis in response to a corresponding pivotal movement of said steerable wheels;

steering means operably connected to said steerable wheels to control the pivotal movement thereof relative to said front axle;

an implement attachment mechanism detachably affixed to said front axle to be supported from said front axle so as to attach an implement thereto forwardly of said tractor such that said implement is laterally movable with said front axle relative to said chassis in response to a corresponding lateral movement of said front axle; and drive means supported on said chassis for operatively powering said tractor.

7. The tractor of claim 6 wherein said implement attachment mechanism includes a frame portion, a lower link assembly pivotally connected to said frame portion, an upper link pivotally connected to said frame portion and a lift mechanism interconnecting said frame portion and said lower link assembly to power a relative pivotal movement therebetween.

8. The tractor of claim 7 wherein said frame portion is detachably affixed to said front axle by fasteners and a support link detachably affixed to said frame portion and being engaged with said pivot assembly to provide additional support for connecting said implement attachment mechanism to said front axle without interfering with the pivotal movement of said front axle relative to said chassis.

9. In a tractor having a chassis; a transverse front axle connected by a pivot assembly to a forward portion of said chassis and having pivotally mounted thereon a pair of laterally spaced steerable wheels, said front axle being pivotally connected to said chassis for lateral movement relative thereto; and steering means operably connected to said steerable wheels and to said front axle to control the pivotal movement of said steerable wheels relative to said front axle and to effect a corresponding lateral movement of said front axle in response to the pivotal movement of said steerable wheels, the improvement comprising:

a three-point hitch implement attachment mechanism detachably mounted to said front axle for lateral movement therewith relative to said chassis, said implement attachment mechanism including a hydraulic lift mechanism to provide operative power for vertically moving any implement mounted to said implement attachment mechanism relative to said chassis.

* * * * *